US010783308B1

(12) United States Patent
Lim et al.

(10) Patent No.: US 10,783,308 B1
(45) Date of Patent: Sep. 22, 2020

(54) METHOD OF ASSIGNING CONTACT ELEMENTS ASSOCIATED WITH AN INTEGRATED CIRCUIT DEVICE

(71) Applicant: Xilinx, Inc., San Jose, CA (US)

(72) Inventors: Lik Huay Lim, Singapore (SG); Andy Widjaja, Singapore (SG); King Yon Lew, Singapore (SG); Xuejing Che, Singapore (SG); Mohsen H. Mardi, Saratoga, CA (US)

(73) Assignee: XILINIX, INC., San Jose, CA (US)

( * ) Notice: Subject to any disclaimer, the term of this patent is extended or adjusted under 35 U.S.C. 154(b) by 0 days.

(21) Appl. No.: 16/227,892

(22) Filed: Dec. 20, 2018

(51) Int. Cl.
*G06F 30/39* (2020.01)
*G06F 3/0482* (2013.01)
*H01L 23/538* (2006.01)
*H01L 23/498* (2006.01)

(52) U.S. Cl.
CPC ............ *G06F 30/39* (2020.01); *G06F 3/0482* (2013.01); *H01L 23/49816* (2013.01); *H01L 23/49833* (2013.01); *H01L 23/5386* (2013.01)

(58) Field of Classification Search
USPC .......................................................... 716/139
See application file for complete search history.

(56) References Cited

U.S. PATENT DOCUMENTS

| | | | | |
|---|---|---|---|---|
| 6,891,384 B2 | 5/2005 | Mardi | | |
| 7,180,318 B1 | 2/2007 | Mahoney | | |
| 7,235,412 B1 | 6/2007 | Mardi | | |
| 7,285,973 B1 | 10/2007 | Mardi | | |
| 7,535,239 B1 | 5/2009 | Dang | | |
| 7,598,727 B1 | 10/2009 | Dang | | |
| 7,737,439 B2 | 6/2010 | Mardi | | |
| 7,872,346 B1 | 1/2011 | Chee | | |
| 7,888,954 B1 | 2/2011 | Mardi | | |
| 8,062,968 B1 | 11/2011 | Conn | | |
| 8,269,518 B1 | 9/2012 | Dang | | |
| 8,269,519 B1 | 9/2012 | Mardi | | |
| 8,493,071 B1 | 7/2013 | Mardi | | |
| 8,542,029 B1 | 9/2013 | Mardi | | |
| 8,659,169 B2 | 2/2014 | Mardi | | |
| 8,743,559 B1 | 6/2014 | Wu | | |
| 9,286,421 B1 * | 3/2016 | Kukal | ..................... | G06F 30/20 |
| 2009/0049419 A1 * | 2/2009 | Kato | ....................... | G06F 30/34 716/128 |

* cited by examiner

*Primary Examiner* — Eric D Lee
(74) *Attorney, Agent, or Firm* — John J. King; Amir Tabarrok

(57) ABSTRACT

A graphical tool for a design of a substrate of an integrated circuit device is described. The graphical tool comprises a processor configured to: display locations of probes for a first plurality of contact elements associated with the substrate; display locations of BGA contact elements associated with the substrate; identify interconnect elements between the first plurality of contact elements and the BGA contact elements; and display connections lines representing the identified interconnect elements. A method of designing a substrate of an integrated circuit device is also described.

20 Claims, 5 Drawing Sheets

START

1002: DISPLAY LOCATIONS OF PROBES FOR A FIRST PLURALITY OF CONTACT ELEMENTS ASSOCIATED WITH THE SUBSTRATE

1004: DISPLAY LOCATIONS OF BGA CONTACT ELEMENTS ASSOCIATED WITH THE SUBSTRATE

1006: IDENTIFY INTERCONNECT ELEMENTS BETWEEN THE FIRST PLURALITY OF CONTACT ELEMENTS AND THE BGA CONTACT ELEMENTS

1008: DISPLAY CONNECTIONS LINES REPRESENTING THE IDENTIFIED INTERCONNECT ELEMENTS

END

METHOD OF ASSIGNING CONTACT ELEMENTS ASSOCIATED WITH AN INTEGRATED CIRCUIT DEVICE

TECHNICAL FIELD

The present invention relates generally to integrated circuit devices, and in particular, to a method of assigning contact elements associated with an integrated circuit (IC) device.

BACKGROUND

An integrated circuit device may often include a substrate that is configured to receive a die, where some contact elements of the substrate adapted to receive corresponding contacts of the die are coupled to other contact elements of the substrate, such as contact elements adapted to receive solder balls of a ball grid array. With the continued efforts to improve integrated circuit devices, such as through decreased size, reduced power, an improved performance for example, changes are always being made, not only to the implementation of the circuits of an integrated circuit device, but also to the packaging of components of an integrated circuit device. Many 3D IC packages are currently available, such as Silicon Stacked Interconnect Technology (SSIT), where a silicon interposer is placed between the package substrate and IC dies. Therefore, the solder balls of the ball grid array could be soldered to a package substrate of an integrated circuit package or to a printed circuit board (PCB).

When communicating signals from the die, there are two types of contacts on the device receiving the die, such as an interposer of a 3D IC package or a packaged substrate. A first type of IO contact is a generic IO that directly communicates signals from a contact element on one side of the substrate to a contact element on the other side. A second type of IO contact is a type of IO which drives and receives signals only between contact elements of one or more IC dies by way of contact elements on one side of the substrate using vias and metal traces metal traces of the substrate. There are generally many more contact elements adapted to receive contacts elements of a die than contact elements on the other side, such as contact elements for solder balls of a ball grid array, where the ball grid array of an interposer may be coupled to a package substrate or the ball grid array of package substrate may be coupled to a PCB. In many cases, multiple contact elements of the substrate receiving the die may be coupled to a single contact element on the other side of the substrate. Therefore, the connections from the contact elements receiving the die may cross over one another, resulting in the substrate requiring multiple layers, where the number of layers required in the substrate increases with the number of crossovers for the connections from the contact elements receiving the die.

Accordingly, there is a need for a method of assigning contact elements in an integrated circuit device that overcomes problems of conventional integrated circuit devices, such as by reducing the number of crossovers, and therefore the number of layers, in a substrate.

SUMMARY

A graphical tool for a design of a substrate of an integrated circuit device is described. The graphical tool comprises a processor configured to: display locations of probes for a first plurality of contact elements associated with the substrate; display locations of BGA contact elements associated with the substrate; identify interconnect elements between the first plurality of contact elements and the BGA contact elements; and display connections lines representing the identified interconnect elements.

A method of designing a substrate of an integrated circuit device is also described. The method comprises displaying locations of probes for a first plurality of contact elements associated with the substrate; displaying locations of BGA contact elements associated with the substrate; identifying interconnect elements between the first plurality of contact elements and the BGA contact elements; and displaying connections lines representing the identified interconnect elements.

DETAILED DESCRIPTION

The method and user interface assign connections in an integrated circuit device, such as in a substrate of an integrated circuit device having contacts for receiving a die (or probes for a test device) and contacts on the other side of the substrate, such as contacts associated with a ball grid array. The substrate may comprise a multilayer substrate, such as a multilayer ceramic (MLC) substrate, where the method assigns contacts such as for a Ball Grid Array (BGA) in a probe card substrate design. A tool for implementing the method may comprise a user interface for showing plot lines between probes and their respective BGA elements to enable a visualization the connections. The tool may also incorporate a feature to auto-swap BGA contact elements to reduce cross-overs between the connections in the substrate. The method and user interface prevent human error of designing the substrate and reduce substrate design time by approximately 2-3 days.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
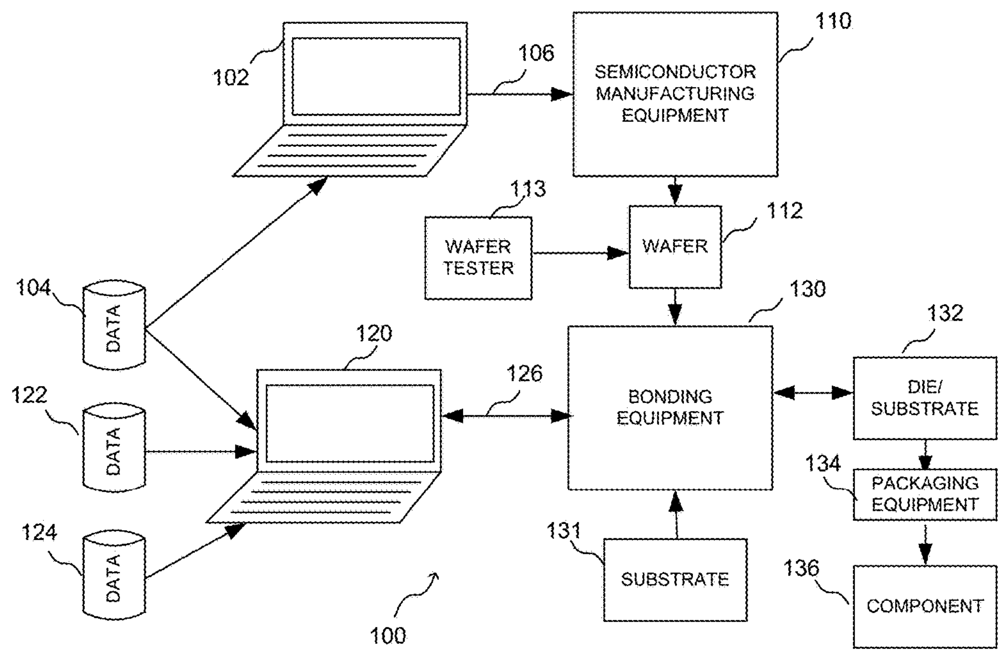
FIG. 1 is a system for producing an integrated circuit device.

Turning first to FIG. 1, a system for producing an integrated circuit device is shown. The system 100 comprises computer-aided design (CAD) equipment 102, which could be any computer adapted to run CAD software. The CAD equipment 102 receives data, such as a master schematic 104 based upon selected values for transistor and interconnect element design, and is coupled by a communication link 106 to semiconductor manufacturing equipment 110. CAD equipment 102 could be used to simulate and determine desired transistor and interconnect element values that improve performance. The CAD equipment 102 may comprise a processor for implementing a graphical tool for a design of a substrate of an integrated circuit device. The semiconductor manufacturing equipment 110 may generate a wafer 112 having a plurality of die, as is well known in the art. A wafer tester 113 may be implemented to test wafers produced by the system before they are packaged in an integrated circuit packaging device. The method of assigning contact elements could be performed at a different stages of the manufacturing process, such as before wafer testing when performing a probe card substrate design, or as a part of a packaging process when determining the assignment of contact elements associated with other package elements, as will be described in more detail below.

CAD equipment 120, which is also coupled to receive the master schematic 104, may receive a bonding diagram 122 and substrate artwork 124. The CAD equipment 120 is coupled by a communication link 126 to bonding equipment 130. The communication links 106 and 126 could be any wired or wireless communication link. The bonding equipment provide wire bonds from a die from the wafer 112 to a substrate 131 receiving the die, or may enable contacts, such as solder bumps between contact pads of the die and corresponding contact pads of the substrate. The bonding equipment may also enable direct chip attach arrangements, die-to-die connections, or other types of connections to contact elements of a die. The die/substrate 132 is coupled to packaging equipment 134 which generates a finished component 136, such as an integrated circuit package. The system of FIG. 1 enables the manufacture of an integrated circuit package according to the various circuits and methods set forth below, and may comprise one or more processors, such as a processor of CAD equipment 102 or 120 or wafer tester 113 for implementing a graphical tool to generate BGA contact element assignments, as shown for example in FIGS. 4-7. That is, depending upon the type of substrate for which BGA contact elements are assigned, a processor of an element of the system of FIG. 1 may implement a graphical tool, as described in more detail FIGS. 4-10. The system of FIG. 1 enables the manufacture of an integrated circuit package according to the various circuits and methods set forth above. Although the system of FIG. 1 provides various elements required for producing an integrated circuit package, it should be understood the elements shown in FIG. 1 could be combined, or additional elements could be provided.

Figure 2:
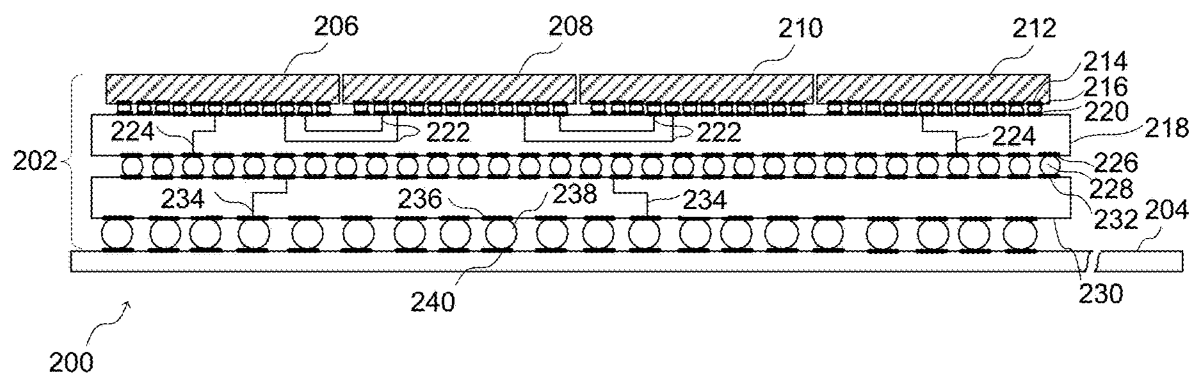
FIG. 2 is a cross-sectional view of an integrated circuit device showing contact pads and connector elements of the integrated circuit device.

Turning now to FIG. 2, a cross-sectional view of an integrated circuit device 200 attached to a printed circuit board is shown. The exemplary device of FIG. 2 comprises an integrated circuit device 202 on a printed circuit board 204. The integrated circuit device 202 comprises a plurality of IC die, shown here by way of example as IC dies 206-212. Each of the die comprises contact elements 214, shown here by way of example as contact pads, where solder bumps 216 are enable the contacts 214 to be coupled to a substrate 218 at corresponding contact elements 220, which may also comprise contact pads.

The substrate 218 may be an interposer that is positioned between the dies 206-212 and package substrate 230 of the integrated circuit device 200. The substrate 218 may comprise different types of interconnect elements, including interconnect elements 224 that enable a connection to the first type of IO described above (i.e. a generic IOs that directly communicates signals by way of through-silicon vias (TSVs) to the package ball to provide signals externally). While the interconnect elements 224 are shown by way of example as having vias and interconnect traces using multiple metal layers, it should be understood that the connection between the dies 206-212 and the package substrate could be implemented with a single TSV that extends from the top of the substrate 218 to the bottom of the substrate 218. Interconnect elements 222 enable a second type of IO that drives and receives signals only between IC dies via micro bumps and interposer metal traces. That is, these types of IOs are inter-die interfaces that are not connected to package pins, and may also be formed using interconnect traces in metal layers and vias to enable the routing of signals from a contact element associated with one of the dies 206-212 to a contact element of another of the dies.

The interconnect elements 222 may also include traces formed in metal layers and vias that are used to connect the traces in the metal layers, and may include other elements, such as transmitter, receivers, and transmission lines. The substrate 218 may also comprise contact elements 226 adapted to receive solder bumps 228 that are coupled to contact elements 232 of the package substrate 230. The package substrate 230 also comprises interconnect elements 234 for providing an electrical connection for the transfer of signals from the contact elements 232 to contact elements 236, which are coupled to solder balls 238 and contact elements 240 of the printed circuit board 204. While the use of interconnect elements that enable the transmission of signals from one die to another die are shown in the substrate 218 that is implemented as an interposer, it should be understood that the methods set forth below could be implemented in other substrates, such as the package substrate 230. While an example of an integrated circuit device of FIG. 2 is shown, it should be understood the circuits and methods could be implemented with other integrated circuit devices.

Figure 3:
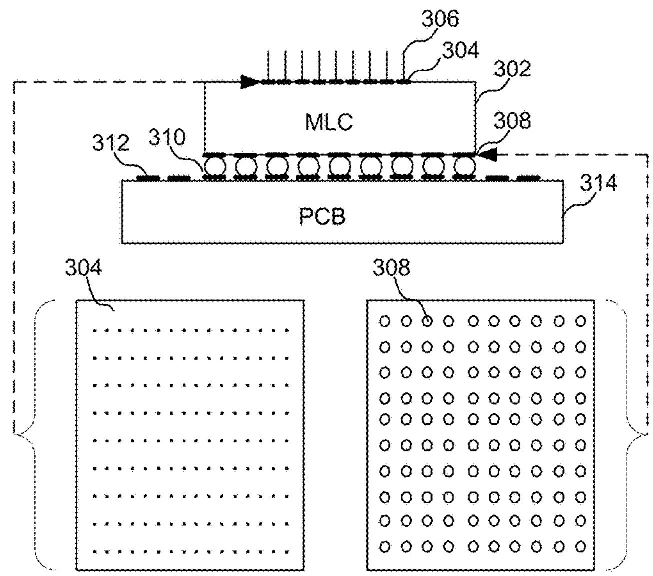
FIG. 3 is a cross-sectional view of a multi-layer ceramic substrate having contact pads adapted to receive test probes and contact pads enabling a connection to a printed circuit board.

Turning now to FIG. 3, a cross-sectional view of a multi-layer ceramic substrate having contact pads adapted to receive test probes and contact pads enabling a connection to a printed circuit board is shown. According to the implementation of FIG. 3, a substrate 302, shown here by way of example as a multi-layer ceramic substrate, comprises a plurality of contact elements 304 that are adapted to receive contact elements of a die for an integrated circuit package or probes 306 associated with a probe card of a tester when the substrate 302 is used in a test environment. That is, the method and user interface may be implemented as a BGA assignment tool for a substrate used for testing of the connections to other contact elements, such as contact elements of a ball grid array attached to a PCB. The substrate 302 comprises contact elements 308, where interconnect elements including vias and traces of metal layers of the substrate provide connections from the contact elements 304 to the contact elements 308, as will be described in more detail below. Contact elements 310, which may be solder bumps or solder balls for example, enable a connection between the contact elements 308 and contact elements 312 of another substrate 314, shown here by way of example as a printed circuit board. As can be seen in FIG. 3, there are many more contact elements 304 than contact elements 308, and there may be connections (formed for example using vias and interconnect elements of the substrate 302) between multiple contact elements 304 and contact elements 308. For example, the contact elements 304 receiving solder bumps of a die may comprises tens of thousands of contact elements and have a pad size of approximately 0.10 millimeters (mm) and a pitch of approximately 0.01 mm. In contrast, the contact elements 308 may comprise approximately three thousand contact elements, and may have a pad size of approximately 0.65 mm and a pitch of approximately 1.00 mm. While the example of FIG. 3 is described in reference to a test system, it should understood that the method and user interface can be implemented in connection with integrated circuit package design, such as for the BGA assignment for a package substrate for example, where the package substrate fans out the die bumps/pads to a BGA of the package.

Figure 4:
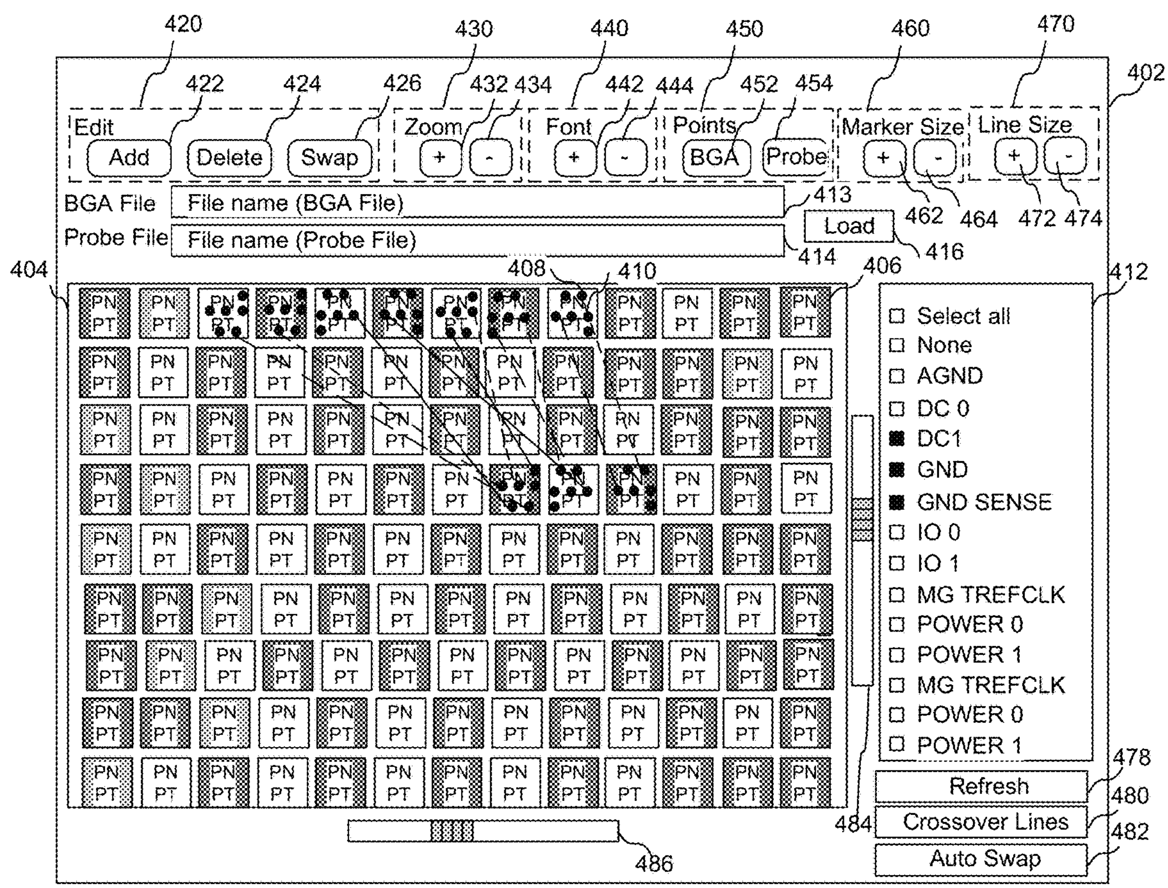
FIG. 4 is a user interface enabling the assignment of contact elements associated with an integrated circuit device.

A user interface for a graphical tool for implementing a method of assigning contact elements is now described in reference to FIG. 4. According to some implementations, a user interface displays a substrate BGA and probes location by XY coordinates. Connections between BGA and their corresponding probes are displayed as straight lines. Options are available to zoom in/out, change the line thickness, font size, and BGA size shown on the display. Probes and BGA contact elements can be grouped by Pad Type so as to display only the specific group of contact elements that is of interest in order to reduce the number of crossovers in the substrate. According to some implementations, the user interface has functions to add, delete, and swap nets associated with contact elements if it may be necessary to manually change a BGA assignment. Providing an automated auto swap function that detects and swap connection lines that cross one another can reduce both the time required to implement the BGA assignment as well as the risk of errors when changing a BGA assignment. The swapping operation may be achieved in a click of a button on the user interface for example. According to some implementations, cross-over lines may also be color-coded to show the severity of cross-overs.

Turning to the exemplary implementation in FIG. 4, a user interface 402 of a graphical tool implemented by a processor and enabling the assigning contact elements associated with an integrated circuit device is shown. The user interface 402 may be displayed on a display, such as a display of CAD equipment 102 or 120, which may be a computer for implementing a graphical tool as described in more detail below for example. The user interface 402 comprises a contact element field 404 showing a plurality of contact elements 406, shown here be way of example as contact pads. According to one implementation, the contact pads could be contact pads 308 associated with a BGA. The different shading of the contact elements 406 indicate that the contact elements are for different types of contacts. For example, the dark shaded contacts may be ground contacts while the unshaded contacts may be input/output (IO) contacts for example. Contact elements 408 of a device above the substrate having the contact elements 406 may comprises probes of a test system, such as probes 306 when the user interface is used for assigning contacts of a substrate of a test system, or contact elements of a die associated with an integrated circuit package, such as solder bumps of the die coupled to the contact elements 304 on top of the substrate receiving the die. The user interface also shows lines 410 associated with the substrate between the contact elements. The lines 410 could be implemented in the substrate using vias and metal traces of metal layers of the substrate for example. While the lines 410 are shown as straight lines representing connection lines, it should be understood that actual interconnect elements associated with the lines 410 may travel in a different path, and that the straight lines are provided to show the electrical connects from probes of a test system or solder bumps of a die to contact elements associated with a BGA of the substrate.

As shown in FIG. 4, the lines 410 may cross over other lines 410, and in some cases, cross over multiple lines. As will be described in more detail below, the lines 410 could be presented in a way that indicates how many cross overs with other lines are associated with a given line, shown by way of example here as having different dashed lines. According to some implementations, lines 410 could be color coded, where lines having no cross overs could be shown in green, lines having 1-4 cross overs could be shown in yellow, lines having 5-7 cross overs could be shown in blue, and lines having more than 7 cross overs could be shown in red. While only some of the lines are shown by way of example, it should be understood that many more interconnect elements may be used.

A selection field 412 is also provided in the user interface to enable the selection of types of contact elements, such as for a BGA, for which the lines 410 are be shown. All or none of the contact elements can be selected, or specific contact elements such as ground or specific groups of IO contacts can be selected by selection a box (shown in dark shading) next to the type of contact element. The user interface may also include fields for selecting files necessary to display the information related to contact elements and lines associated with interconnect elements of the substrate. According to the exemplary implementation of FIG. 4, a first field 413 enables a selection of a file name for first contact elements, shown here by way of example as a field for receiving a BGA file for contact elements 308, and a second field 414 enables a selection of a file name for second contact elements, shown here by way of example as a field for receiving a Probe file associated with contact elements 304 for receiving probes associated with a test system. The information in the first field 413 and the second field 414 may be entered by using a computer peripheral, such as a keypad for example. However, it should be understood that the second file could also be for solder bumps associated with a die that is coupled to contact pads of the substrate receiving the die, where the data associated with the files could be loaded in response to a selection of the load button 416.

The user interface includes a number of user selectable fields for enabling the manually changing of the assignment of contacts elements, such as the assignment of nets to contact elements 308 of a BGA. That is, while the assignment of the contact elements 304 receiving the probes or the solder bumps of a die is fixed based upon the layout and functionality of the die, the assignment of nets to contact elements 308 can be selected, and more particularly selected to reduce the crossover of interconnect elements of the substrate having the contact elements receiving the probes or the solder bumps of the die (and therefore reduce the number of layers of the printed circuit board). The user interface may also comprise fields enabling the changing of the information displayed in the contact element field 404, which may be for example touch screen elements on a touch screen display or controlled by a computer peripheral, such as a mouse. For example, an edit field 420 may comprise an Add button 422, which when selected would provide a command to add a contact element, also known as a net, associated with the file such as a BGA file, at a selected location, as will be described in more detail below in reference to FIG. 5. The edit field 420 may also comprise a Delete button, which when selected would provide a command to delete an assignment of a net to a contact element associated with the file at a selected location, as will be described in more detail below in reference to FIG. 6. The edit field 420 may comprise a swap button 426, which when selected would provide a command to switch nets assigned to contact elements, as will be described in more detail below in reference to FIG. 7.

Other fields can be provided to change the presentation of the contact element field 404. For example, a zoom field 430 enables zooming in or out on the information displayed in the contact element field 404 in response to the selection of the plus button 432 for zooming in or the minus button 434 for zooming out. A font selection field 440 enables increasing or decreasing the size of the font for information displayed in the contact element field 404 in response to the selection of the plus button 442 for increasing the size of the font or the minus button 444 for decreasing the size of the font. For example, the font field can be used to adjust the size of the text labels (i.e. a pad name or pad type) inside the BGA pad for readability. A points field 450 is provided to enable a selection of either the BGA or the probe to highlight, where the BGA button 452 is selected for selecting the points for the BGA and the probe button 454 is selected for selecting the points for the probe. The size of the markers and lines can also be selected. The markers field 460 allows a user to increase or decrease the size of the BGA or probe depending on which is selected in the point fields 450. For example, a size of a marker indicating a location of a contact to a BGA pad or a probe in the case of using the method or user interface for a test system or the location of a contact element such as a solder bump of a die in the case of using the method or user interface for assigning contact pads of a substrate of an integrated circuit package can be selected. The size of the marker can be increased by selecting the plus button 462 and decreased by selecting the minus button 464. There are some instances when the user may want to view the connection lines more clearly without turning off the markers completely. By making the marker size appear smaller, it is possible to improve the experience of the user by more clearly displaying the connection lines. A line size for the lines 410 can also be adjusted, where a line width can be made larger by selecting the plus button 472 and can be made smaller by selecting the minus button 474 of a line size field 470. Changing the line width of the connection lines 410 also allows the user to see the connection lines and cross-overs more easily. When in a zoomed-out view, thin lines may not be seen clearly. By enabling the line widths of the connection lines to be changed, the user can more clearly see the connection lines. In contrast, in a zoomed-in view, thinner lines may be more desirable for the user to see which line or lines are crossing other lines.

Other options enabling changing the user interface, such as refreshing the display, be made by selecting the refresh button 478. The display of crossover lines can also be adjusted by selecting the crossover lines button 480, where the display of lines associated a number of crossovers can be selected. That is, differentiated connection lines could be displayed to indicate differences in the number of crossovers associated with the connection lines. According to some implementations, line coloring can be selected where the coloring of connection lines would be used to provide differentiated connection lines to indicate a severity of the crossovers. However, any other variation in the display of different lines representing a different number of crossovers could be implemented to provide differentiated connection lines, such as different dashed lines or lines having different thicknesses, for example. While the lines 410 are shown by way of example as having different dashed-line patterns, the lines could be color coded to more easily identify contact pads that may be moved. For example, a line having no crossovers could be shown in green, a line having 1-4 crossovers could be shown in yellow, a line having 5-7 crossovers could be shown in blue, and a line having more than 7 crossovers could be shown in red. An Auto Swap button 482 could enable the automatic swapping of contact elements to lead to a resulting arrangement of contact elements, such as an assignment of nets to contact elements of a BGA arrangement that leads to a reduced amount of crossovers. For example, the auto swap button could be sequentially selected to enable a user to see changes in the number of crossovers associated with certain lines. Pad types (e.g. contact element types associated with contact pads of a BGA) can be selected, where the auto swapping can be iteratively selected to reduce the number of crossovers. The BGAs shown in the contact element field 404 can be changed by using the cursoring bars 484 and 486. The method and user interface also eliminate human error by maintaining connections when swapping BGAs, so there is no accidental deletion of connections. While specific elements of the user interface are shown, it should be understood that not all features are required, but could be selectively implemented, other features could be added, or features could be combined into a single operation.

Figure 5:
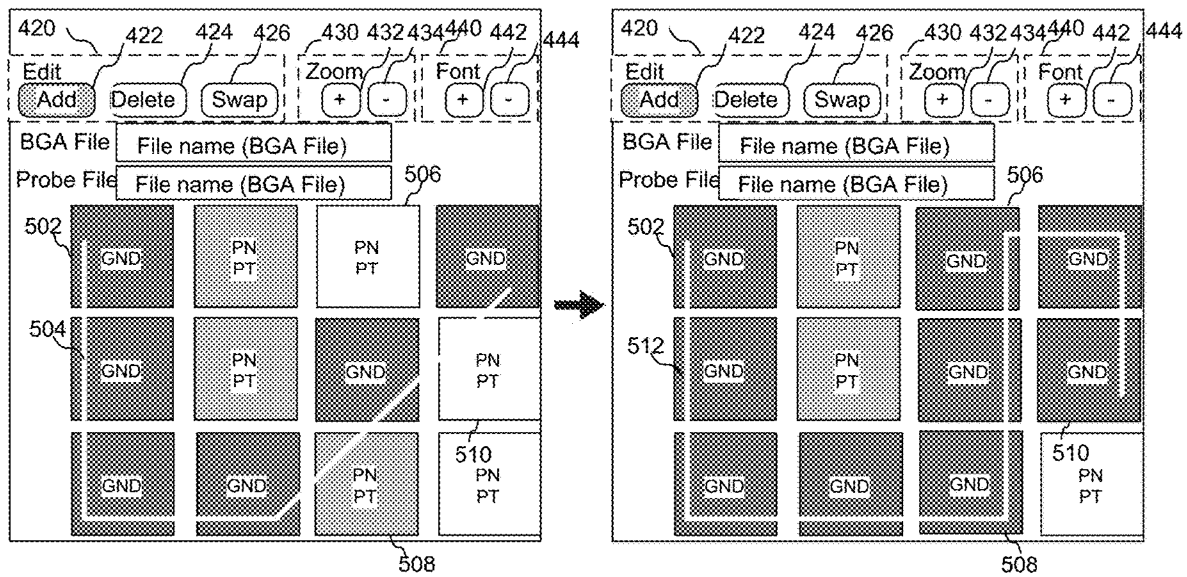
FIG. 5 shows an example of an add feature of the user interface of FIG. 4.

Turning now to FIG. 5, an example of an add feature of the user interface of FIG. 4 is shown. More particularly, FIG. 5 shows the creation of a net in response to the selection of a contact element. After the add button 422 is selected, a contact element is then selected to create a net, which represents a group of nodes of a path that are connected, shown here by way of example as line 504 that may be implemented using vias and metal traces of the substrate having the contact elements, such as contact element 502 (which is shown here by way of example as a ground contact). After a contact element is selected, such as contact element 502 for example, the additional contact elements 506, 508 and 510 associated with the net are added to create a line 512 that reduces the number of crossovers as shown in the right side of FIG. 5. It may be beneficial to increase the number of vias of a power supply or ground BGA in a particular area of the substrate using the add button. This may be done to allow more electrical current required in that area. The add button can be used to convert a BGA to the selected (i.e. targeted) net by sacrificing a BGA of another net.

Figure 6:
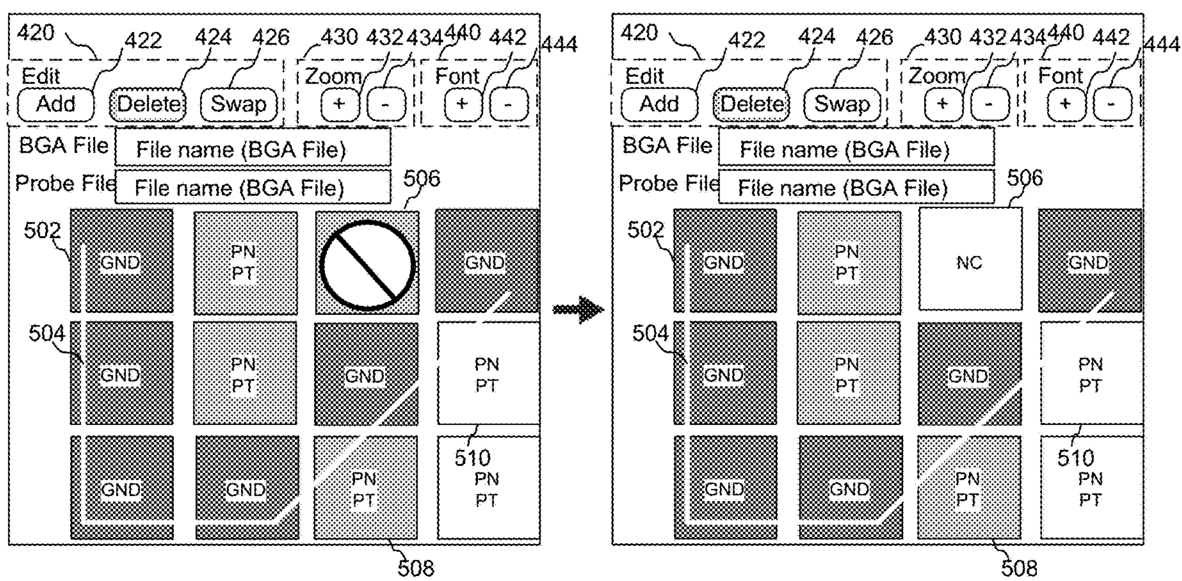
FIG. 6 shows an example of a delete feature of the user interface of FIG. 4.

Turning now to FIG. 6, an example of a delete feature of the user interface of FIG. 4 is shown. After the delete button 424 is selected, a contact element can be selected, shown here by way of example as contact element 506 on the left side of FIG. 6, resulting in an arrangement where contact element 506 has no connection (NC). There may be times when more routing space is required in an overcrowded area of the substrate. The delete button may be used to remove any net (i.e. connection) assigned to the selected BGA and thus also removes any via/routing associated with it. This removal allows more routing space for other nets and reduces crossovers. Another use is to disconnect a PCB BGA from the substrate, such as of the delete button where a common PCB for different substrates is used. For example, substrate A and B may share the same PCB, but substrate A has a connection that is not present in substrate B. So the connection can be terminated at the PCB by making the concerned BGA on substrate B to be an "NC".

Figure 7:
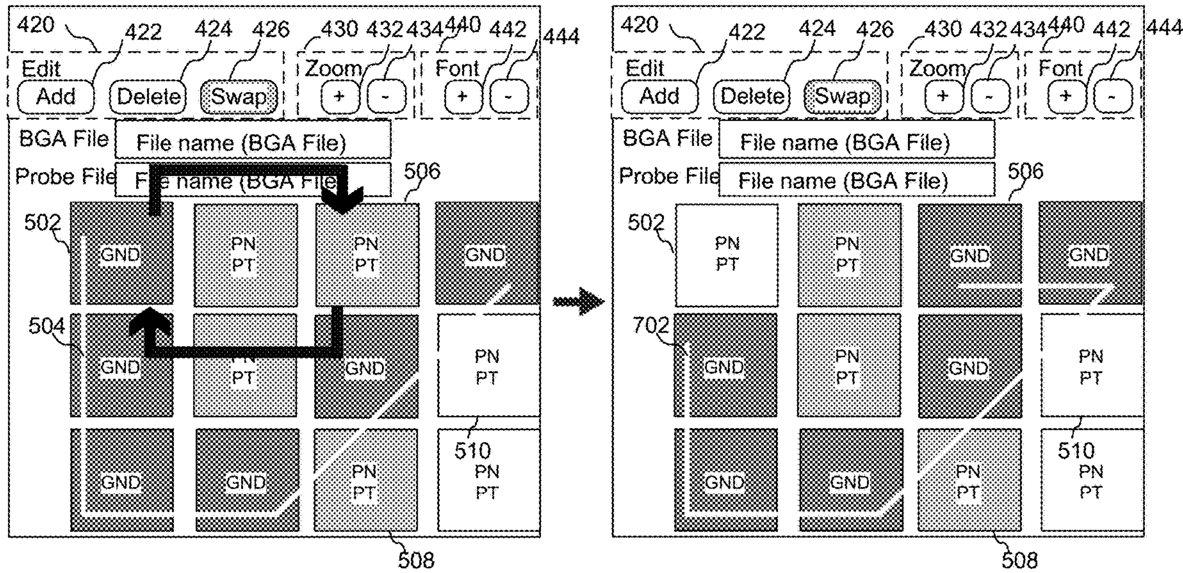
FIG. 7 shows an example of a swap feature of the user interface of FIG. 4.
Figure 8:
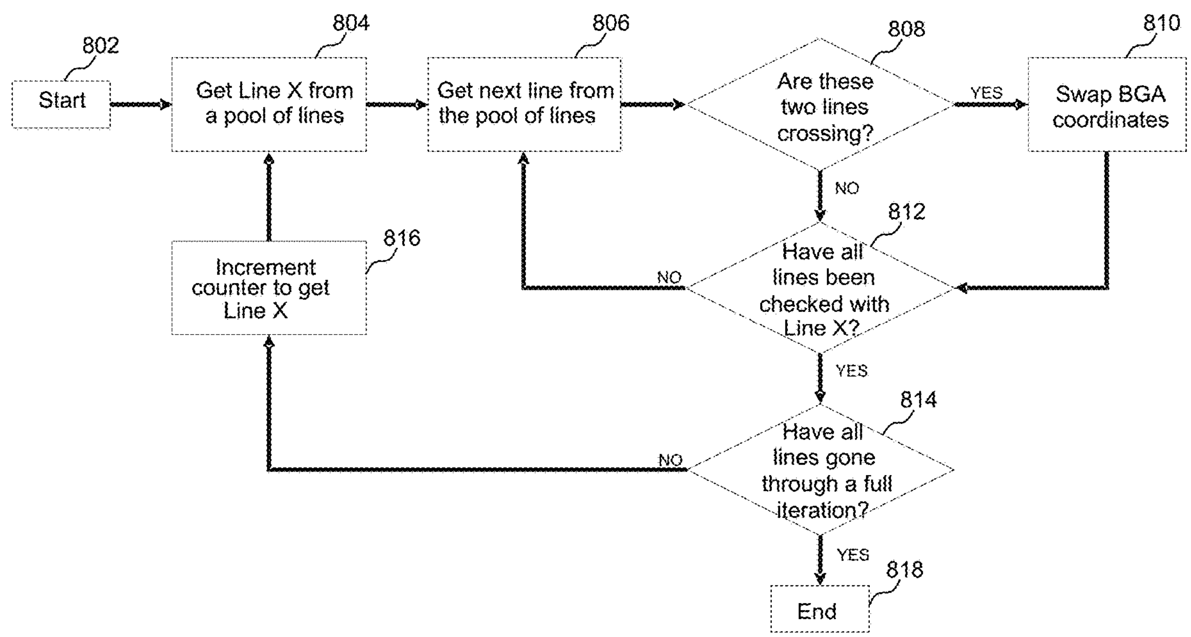
FIG. 8 is a flowchart showing an example of an auto-swapping operation.

Turning now to FIG. 7, an example of a swap feature of the user interface of FIG. 4 is shown. As shown in FIG. 7, two contact elements can be selected to be swapped. After the swap button 426 is selected for example, two of the contact elements can be selected to be sapped, shown here by way of example as contact elements 502 and 506. After the contact elements are selected to be swapped as shown in the left side of FIG. 7, a new line 702 is created, where the new line would have a lower number of crossovers. The autoswap function (performed in response to the selection of button 482 of FIG. 4) will rearrange the BGA's in such a manner that will produce zero or minimal crossovers as much as possible. But sometimes there is a net that needs to be assigned to a particular area of the substrate (e.g. to the edges of the BGA grid for better electrical component placement). The manual swap button allows the user to make such a special swapping.

The method and user interface provide a beneficial user experience by providing labels on a plotted graph showing BGA pads and showing lines that represent the connections. Line width adjustment and zoom function also provide a user with options to enable an improved user interface. The BGA size is changeable, to enable reducing visual clutter and provide focus on the connection lines. That is, the methods and user interface provide a filter which group of connections (lines) to view by pad type selection. Also, the use of color-coded lines indicating a severity of cross-overs make it much easier to visualize areas of the substrate having cross overs that could be reduced. By providing an auto-swapping function, a user of the method or user interface can automatically make changes to the assignment of the BGA without having to determine changes to the BGA that will reduce cross overs.

According to one implementation, an auto-swapping function may first take two connection lines and determine whether they intersect each other. Each connection line may be represented by the XY coordinates of two points, one point may be the probe and the other point may be the BGA contact element. By comparing the coordinates of these two connection lines, it would be determined whether they cross each other. If they cross, the BGA contact elements (which may be represented by a net or XY coordinates for the contact elements) of the two connection lines are swapped. It should be noted that only the coordinates of the BGA contact elements are swapped, while the other contact elements associated with the connection lines, such as for a probe, remain. While the crossing between the 2 lines can be eliminated, other lines that may still cross. Therefore, the process is repeated in a loop until all lines are checked against a current line According to the example of an auto-swapping operation in FIG. 8, after an auto-swapping operation is started at a block 802, a current line, designated as line X, from a pool of lines (which may be connection lines between BGA contact elements and probes or contact elements for receiving a die as described above) is obtained at a block 804. A next line is also obtained at a block 806 to enable a comparison of 2 lines. It is then determined whether the two lines are crossing at a block 808. If so, the BGA contact elements (i.e. the location of the BGA contact element) for the 2 compared contact lines are swapped at a block 810. After the BGA coordinates are swapped or if the lines are not crossing, it is determined whether all of the lines have been checked with respect to the current line at a block 812. If not, the next line from the pool of lines is obtained at the block 806. If all of the lines have been checked against the current line, it is determined whether each line has gone through a full iteration with respect the other lines at a block 814. If not, the current line will be incremented at a block 816, and the current line will then be compared to all of the other lines. If each line has been compared to the other lines, the auto-swapping operation ends at a block 818.

It should be noted that when two BGA contact elements are swapped, the crossing between these two particular BGA contact elements can be eliminated. However, there are other lines that may in turn become crossed with the 2 new lines as a result of the swap. Therefore, the first line may again be checked with the next line in the pool until all lines are checked. The process is again repeated on the second line and repeated until all lines are checked, as described in reference to FIG. 8. There may be some instances when the number of crossovers is never reduced to zero regardless of the number of auto-swap iterations, resulting in an infinite loop. According to some implementations, the iterations could be fixed such that each line will run through the full comparison check once. Based on the results, the user could determine whether or not to run another iteration of the auto-swapping operation. It should be noted that providing differentiated connection lines, such as through color-coding of the connection lines, the number of crossovers can be more easily identified by the user, enabling the user to decide whether to run another iteration of auto-swapping. According to other implementations, a target crossover count could be set, where the auto-swapping iterations would be run until the crossover count was reached. If the target crossover count is not reached after some predetermined number of auto-swapping iterations, the auto-swapping operation could be terminated.

Figure 9:
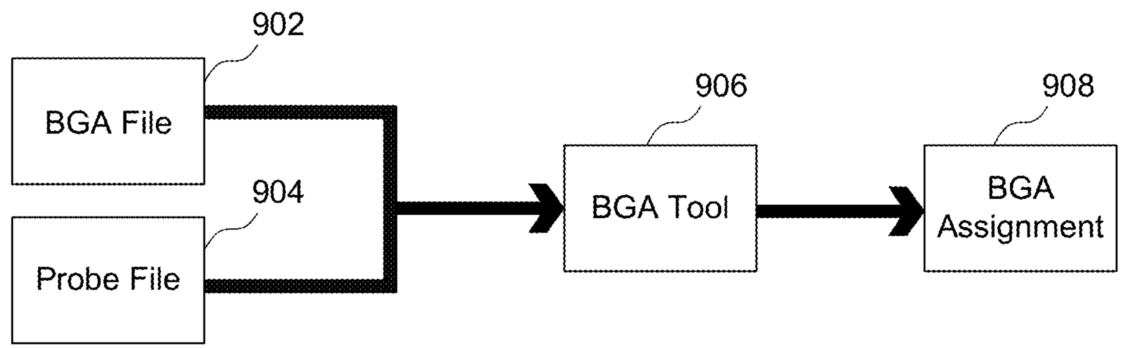
FIG. 9 is a diagram showing the assignment of contact pads associated with a ball grid array of an integrated circuit device.

Turning now to FIG. 9, a diagram shows the assignment of contact pads associated with a ball grid array of an integrated circuit device is shown. A BGA file 902 and a probe file 904 are provided to a BGA tool 906. The BGA tool 906 may be implemented on a computer, such as a computer implemented in the system of FIG. 1 for producing an integrated circuit device, including CAD equipment 102 and 120. The BGA tool 902 may generate a BGA assignment 908, such as shown in FIG. 4 and which may be used by a probe card vendor for creating a probe card that could be used in a test system.

Figure 10:
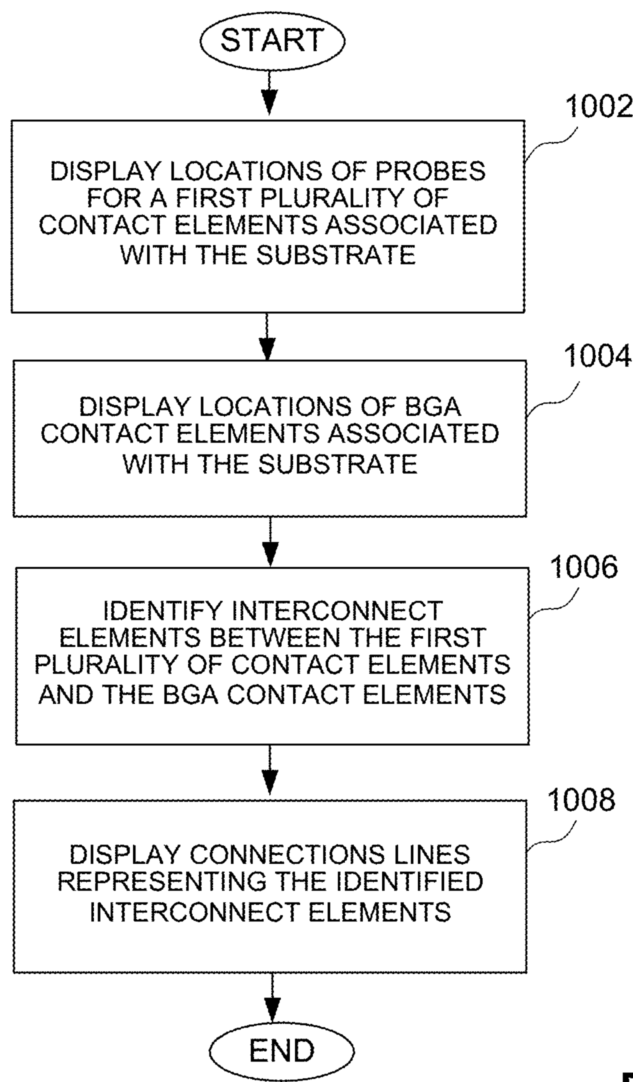
FIG. 10 is a flow chart showing a method of assigning contact elements in an integrated circuit device.

Turning now to FIG. 10, a flow chart shows a method of assigning contact elements in an integrated circuit device. In particular, locations of probes for a first plurality of contact elements associated with the substrate are displayed at a block 1002. Locations of BGA contact elements associated with the substrate are displayed at a block 1004. Locations of the first plurality of contact elements and the BGA contact elements displayed on a display can be implemented as shown for example in FIGS. 4-8. Interconnect elements, such as metal traces and vias of a substrate, between the first plurality of contact elements and the BGA contact elements are identified at a block 1006. Connections lines, such as connection lines 406, representing the identified interconnect elements displayed at a block 1004.

The method implemented by the non-transitory computer-readable storage medium may further comprise receiving a command to add a net from the first contact file, a command to delete a net of the substrate, and a command to swap contacts of the substrate. Receiving a command to swap contacts of the substrate may comprise receiving an auto-swap command. Assigning interconnect elements to reduce crossover of the connections of the substrate may comprise iteratively assigning interconnect elements to eliminate crossover. The method may further comprise providing a user interface to enable a user to a net, delete a net, or swap ball grid array pads, wherein the user interface further enables selecting dimensions of ball grid array pads and metal traces. The method may also comprise applying test signals to contacts of a die attached to the substrate.

According to some implementations, displaying connection lines may comprise displaying color-coded connection lines associated with the interconnect elements on a user interface such as a display, wherein the color-coded connection lines indicate differences in a number of crossovers associated with the interconnect elements. Displaying locations of probes for the first plurality of contact elements and locations of BGA contact elements may further comprise displaying contact elements according to contact type. The method may further comprise enabling a zoom-in and a zoom-out of the BGA contact elements displayed by the graphical tool, enabling a selection of a thickness of the connection lines displayed by the graphical tool, and enabling a selection of a size of markers associated with the first plurality of contact elements displayed by the graphical tool. The method may also comprise receiving a command to swap nets (which may be XY coordinates for example assigned to contact elements) for the 2 BGA contact elements associated with 2 connection lines, where the command may be an auto swap command. A selection of a contact element of the BGA contact elements displayed by the graphical tool may be enabled to change an assignment of the BGA contact elements to reduce crossover of the interconnect elements between the first plurality of contacts and the BGA contact elements. A probe card substrate of the integrated circuit device for receiving the probes of a tester may also be generated The method of FIG. 10 may be implemented using the circuits of FIGS. 1-9 as described, or using some other suitable circuits. While specific elements of the method are described, it should be understood that additional elements of the method, or additional details related to the elements, could be implemented according to the disclosure of FIGS. 1-9.

It can therefore be appreciated that new methods of assigning contact elements in an integrated circuit device have been described. It will be appreciated by those skilled in the art that numerous alternatives and equivalents will be seen to exist that incorporate the disclosed invention. As a result, the invention is not to be limited by the foregoing implementations, but only by the following claims.

What is claimed is:

1. A graphical tool for a design of a substrate of an integrated circuit device, comprising:

a processor configured to:

display locations of probes for a first plurality of contact elements disposed on a first side of the substrate;

display locations of BGA contact elements disposed on a second side of the substrate;

identify interconnect elements within the substrate, wherein the identified interconnect elements make a connection between the first plurality of contact elements on the first side of the substrate to the BGA contact elements on the second side of the substrate; and display connections lines representing the identified interconnect elements.

2. The graphical tool of claim 1, wherein displaying connection lines comprises displaying differentiated connection lines associated with the interconnect elements on a user interface, wherein the differentiated connection lines indicate differences in a number of crossovers associated with the interconnect elements.

3. The graphical tool of claim 1, wherein displaying locations of probes for the first plurality of contact elements and locations of BGA contact elements may further comprise displaying contact elements according to contact type.

4. The graphical tool of claim 1, further comprising enabling a zoom-in and a zoom out of the BGA contact elements displayed by the graphical tool.

5. The graphical tool of claim 1, further comprising enabling a selection of a width of the connection lines displayed by the graphical tool.

6. The graphical tool of claim 1, further comprising enabling a selection of a size of markers associated with the first plurality of contact elements displayed by the graphical tool.

7. The graphical tool of claim 1, further comprising swapping contact elements of the BGA contact elements displayed by the graphical tool to reduce a number of crossovers associated with the interconnect elements.

8. The graphical tool of claim 7, wherein swapping contact elements of the BGA contact elements displayed by the graphical tool comprises automatically swapping contact elements of the BGA contact elements.

9. The graphical tool of claim 8, wherein automatically swapping contact elements of the BGA contact elements comprises identifying a crossover between a first connection line and a second connection line, and swapping a BGA contact element of the first connection line and a BGA contact element of the second connection line when the crossover between the first connection line and the second connection line is identified.

10. The graphical tool of claim 9, wherein automatically swapping contact elements of the BGA contact elements comprises an iterative operation for identifying, for each connection line, crossovers with other connection lines.

11. The graphical tool of claim 7, wherein swapping contact elements of the BGA contact elements displayed by the graphical tool comprises assigning a BGA contact element to a particular area of the substrate.

12. The graphical tool of claim 1, further comprising generating a probe card substrate for the integrated circuit device for receiving the probes of a tester.

13. A method of designing a substrate of an integrated circuit device, the method comprising:

displaying locations of probes for a first plurality of contact elements disposed on a first side of the substrate;

displaying locations of BGA contact elements disposed on a second side of the substrate;

identifying interconnect elements within the substrate, wherein the identified interconnect elements make a connection between the first plurality of contact elements on the first side of the substrate to the BGA contact elements on the second side of the substrate; and displaying connections lines representing the identified interconnect elements.

14. The method of claim 13, wherein displaying connection lines comprises displaying differentiated connection lines associated with the interconnect elements on a user interface, wherein the differentiated connection lines indicate differences in a number of crossovers associated with the interconnect elements.

15. The method of claim 13, wherein displaying locations of probes for the first plurality of contact elements and locations of BGA contact elements further comprises displaying contact elements according to contact type.

16. The method of claim 13, further comprising enabling a zoom-in and a zoom out of the BGA contact elements displayed by the graphical tool.

17. The method of claim 13, further comprising enabling a selection of a width of the connection lines displayed by the graphical tool.

18. The method of claim 13, further comprising enabling a selection of a size of markers associated with the first plurality of contact elements displayed by the graphical tool.

19. The method of claim 13, further comprising swapping contact elements of the BGA contact elements displayed by the graphical tool to reduce a number of crossovers associated with the interconnect elements.

20. The method of claim 19, wherein swapping contact elements of the BGA contact elements displayed by the graphical tool comprises automatically swapping nets assigned to contact elements of the BGA contact elements.

* * * * *